(12) United States Patent
Bryant et al.

(10) Patent No.: US 8,553,527 B2
(45) Date of Patent: Oct. 8, 2013

(54) SYSTEM AND METHOD FOR DYNAMICALLY ASSIGNING VALUES IN A NETWORK

(75) Inventors: Stewart Frederick Bryant, Merstham (GB); Ian Michael Charles Shand, Cobham (GB)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 12/476,914

(22) Filed: Jun. 2, 2009

(65) Prior Publication Data

US 2010/0303091 A1   Dec. 2, 2010

(51) Int. Cl.
G06F 11/00 (2006.01)
(52) U.S. Cl.
USPC ........... 370/216; 370/432; 370/217; 370/248; 370/254; 370/255
(58) Field of Classification Search
USPC .......................... 370/432, 217, 248, 254, 255
See application file for complete search history.

(56) References Cited

U.S. PATENT DOCUMENTS

| | | | | |
|---|---|---|---|---|
| 6,788,681 B1 * | 9/2004 | Hurren et al. | | 370/389 |
| 7,701,970 B2 * | 4/2010 | Krits et al. | | 370/466 |
| 2004/0114559 A1 * | 6/2004 | Wang | | 370/338 |
| 2006/0034278 A1 * | 2/2006 | Hundscheidt et al. | | 370/390 |
| 2006/0187819 A1 * | 8/2006 | Bryant et al. | | 370/216 |
| 2007/0160039 A1 * | 7/2007 | Xu | | 370/389 |
| 2008/0117861 A1 * | 5/2008 | Balandina et al. | | 370/328 |
| 2009/0303902 A1 * | 12/2009 | Liu et al. | | 370/254 |
| 2010/0074175 A1 * | 3/2010 | Banks et al. | | 370/328 |
| 2010/0214913 A1 * | 8/2010 | Kompella | | 370/230 |
| 2010/0272111 A1 * | 10/2010 | Kini et al. | | 370/395.53 |

OTHER PUBLICATIONS

Previdi, Stefano, "IP Fast Reroute Technologies", http://www.apricot.net/apricot2006/slides/conf/thursday/Stefano_Previdi_IPFRR-Apricot.pdf Retrieved Feb. 21, 2012, (2006), 60 pgs.

* cited by examiner

Primary Examiner — Kibrom T Hailu
Assistant Examiner — Zewdu A Beyen
(74) Attorney, Agent, or Firm — Schwegman, Lundberg & Woessner, P.A.

(57) ABSTRACT

The embodiments described herein present methods and apparatus for dynamically assigning values in a network. A method includes receiving, at a designated value allocator from a network node, a first broadcast message using a link-state protocol. The method then identifies the first broadcast message as including a request to associate a parameter value to the network node and allocates an assigned parameter value to the network node based on the identification of the request included in the first broadcast message. A message that includes the assigned parameter value is then transmitted to the network node. Other embodiments are described.

13 Claims, 4 Drawing Sheets

SYSTEM AND METHOD FOR DYNAMICALLY ASSIGNING VALUES IN A NETWORK

FIELD

The present disclosure relates generally to communication networks and more particularly, to a system and method for dynamically assigning values in a network.

BACKGROUND

In computer networking environments, each node on a network has one or more values associated with it. The values may be unique to a single node or common to several nodes. The values may be assigned. Assigning values to a particular node may occur in various ways.

An operator or network administrator may manually configure the node and assign a value, such as a network address. However, manual assignment is inefficient and may require specialized knowledge of the network's topology, administrative software, hardware configuration, network security, or other aspects of network administration. In addition, manual assignment is prone to operator error, which may have network-wide implications, particularly in enterprise-wide network systems. When considering the situation where each node is to be assigned multiple values, manual assignment becomes increasingly complex at the expense of stability, reliability, and efficiency.

BRIEF DESCRIPTION OF DRAWINGS

The present disclosure is illustrated by way of example and not limitation in the figures of the accompanying drawings, in which like references indicate similar elements and in which.

DESCRIPTION OF EMBODIMENTS

In the following description, for purposes of explanation, numerous specific details are set forth in order to provide a thorough understanding of an embodiment of the present disclosure. It will be evident, however, to one skilled in the art that the present disclosure may be practiced without these specific details.

OVERVIEW

In an embodiment, a method for assigning a value to a network node comprises receiving, at a designated value allocator from a network node, a first broadcast message using a link-state protocol. The method then identifies the first broadcast message as including a request to associate a parameter value to the network node and allocates an assigned parameter value to the network node based on the identification of the request included in the first broadcast message. A message including the assigned parameter value is transmitted to the network node. The designated value allocator is a network node selected from a plurality of network nodes in an electronic network, in an embodiment. In addition, in another embodiment, the first broadcast message is broadcast from a network node in the electronic network to every other network node in the electronic network.

In an embodiment, identifying the first broadcast message as including a request may be performed by examining the first broadcast message for a request flag, accessing the value of the request flag, and identifying that the first broadcast message includes the request based on the value of the request flag. The request flag may be used in combination with a requested parameter value. As such, in an embodiment, the method further comprises examining the first broadcast message for a requested parameter value, determining whether the requested parameter value is available to be assigned to the network node, and allocating the requested parameter as the assigned parameter when the requested parameter is available.

In an embodiment, a method for requesting a value at a network node comprises broadcasting a first message that includes a request for a parameter value across an electronic network from the network node. The network node receives a response message including an assigned value and stores the assigned value. Then, the network node broadcasts a second message across the electronic network from the network node, where the second message includes the assigned value. In an embodiment, the first message includes a request flag set to indicate that the first message is a request for a parameter value. In another embodiment, the first message includes a previously-assigned parameter value and a request flag, the request flag being set to indicate that the first message is a request for a parameter value and the previously-assigned value being a value that the network node prefers to be assigned to the parameter value.

A "network node" is an electronic device attached to a network. A network node can refer to a wide variety of communication network devices ranging from less-complex devices, such as consumer-grade routers or hubs, to more-complex devices, such as commercial-grade routers or switches. Network nodes also include host computers, such as workstations, servers, handheld devices, portable devices, or other terminal devices.

A "link-state protocol" is a routing protocol that is used in a packet-switched network. Link-state routing works by having each router tell every other router on the network about its closest neighbors. Rather than distributing the entire routing table, in link-state routing only the part of the routing table that relates to the router's neighbors is distributed. The neighbor information is gathered continuously and then the information is flooded across the network. In some cases, neighbor information is flooded when there is a significant change in the network. As every router knows everything about the network from the flooded information, each router can determine the best path to any host on the network.

In many contexts, values are assigned to network nodes. The values may be assigned at various layers, as defined in the Open Systems Interconnection Reference Model (OSI Reference Model or OSI Model). For example, Media Access Control addresses (MAC address) are quasi-unique identifiers that are assigned to a hardware component and available at the data link layer in the OSI Model. As another example, Internet Protocol (IP) addresses are assigned to nodes in an electronic network and these IP addresses exist primarily at the network layer of the OSI Model. Assigning values, such as addresses, to nodes in a network can be an arduous task when the network is large or complex. Automatic and dynamic assignment can relieve a human operator from this burden.

EMBODIMENTS

The embodiments described herein present methods and apparatus for dynamically assigning values in a network. One technique of assigning values includes using an underlying communication protocol. While much of the description refers to link-state protocols, it is understood that any broadcast type protocol may be used. For example, a distance-vector routing protocol, such as RIP (Routing Information Protocol) or IGRP (Interior Gateway Routing Protocol), may be used.

In general, broadcast protocols are based on flooding information throughout a network. In the case of a link-state routing protocol, information is distributed in a link-state packet (LSP). A link-state packet may include a router's interface information, information on the router's neighbors, and additional information. Some information may be encapsulated as type-length-value (TLV) elements in the LSP. A TLV is a data object that includes three fields: the type field, the length field, and the value field. The type field is used to indicate the value-type, the length field is used to indicate the length of the value, and the value field is used to convey the data value. Using LSPs, other routers and devices in the network are apprised of the sending router's state. This mechanism can be reused as a pseudo request mechanism. That is, as a router is advertising its state, another device on the network may be used to monitor that advertised state. If the advertised state is invalid, then the monitoring device may provide the advertising router a proper value to use for the state. Using the underlying broadcast advertising mechanism, the monitoring device may confirm that the advertising router is using a correct state by capturing and analyzing subsequent advertisements.

Figure 1:
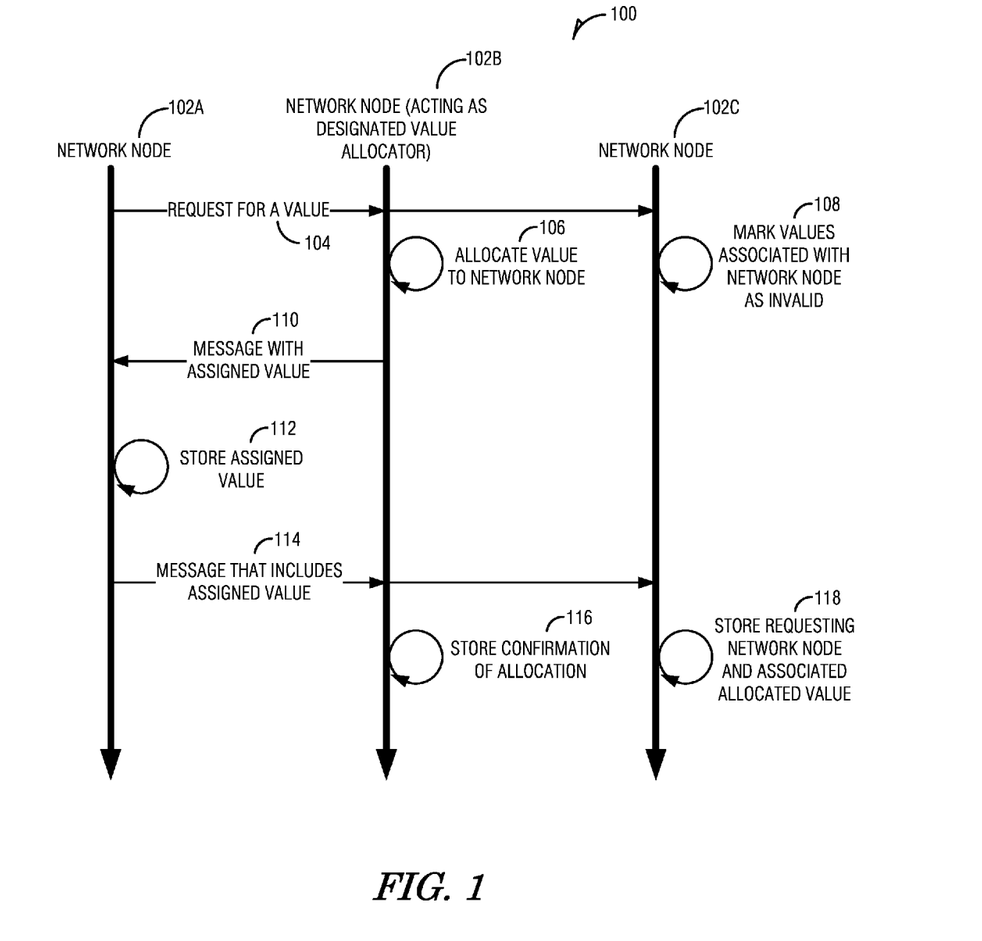
FIG. 1 is a flow diagram illustrating communication between multiple nodes in a network environment, in accordance with an embodiment.

FIG. 1 is a flow diagram illustrating communication between multiple nodes 102A, 102B, 102C in a network environment 100, in accordance with an embodiment. The network environment 100 includes multiple network nodes 102A, 102B, 102C, with network node 102A acting as a requesting node, network node 102B acting as a designated value allocator (DVA), and network node 102C acting as a potential designated value allocator (PDVA).

A value allocator is a node configured to administer a pool of values to be assigned or allocated to nodes in a network. As an example, a value allocator may be configured to administer a pool of network addresses with one or more addresses to be assigned to one or more nodes in the network.

A number of network nodes in a flooding domain may be configured as potential designated value allocators (PDVA). More than one network node may be used for redundancy. It is possible that all network nodes are configured as PDVAs. One aspect of configuring a PDVA includes providing the pool of values to be maintained. The pool of values may be represented as a range of network addresses, such as a master block (or blocks) to be used for not-via addresses.

A designated value allocator (DVA) is a node that has been elected by a mechanism. In an embodiment, the DVA is a node selected from the group PDVA nodes with the highest system identifier. A PDVA includes nodes that are configured as being a potential DVA. When configured as such, the PDVAs advertise their potential in a broadcasted message. The broadcasted message is termed a "capability message" and indicates that the advertising device is a PDVA. Some protocols include a single capability message. In this case, the capability message may be implemented as a flag within an existing capability message. As another example, the advertisement may be a type-length-value (TLV) element within an underlying communication protocol. In an embodiment, the TLV is included in a link state packet (LSP). When the capability message is encoded in a TLV, it may be referred to as a "capability TLV."

The DVA is then elected from the group of advertising PDVA nodes. In an embodiment, the election is conducted by identifying the PDVA with the highest system identifier that is reachable by the routing protocol at the time of the election. Other mechanisms may be used to elect the DVA. For example, a list of PDVAs may be maintained and then working from one end of the list to the other end, a DVA is elected based on the first available node identified. As another example, the PDVA node with the greatest amount of uptime may be elected as the DVA.

At some point in time, a network node 102A may broadcast a message that acts as a request for a value 104 to the network node acting as the DVA 102B. The request message 104 is transmitted using a broadcast protocol, and as such, the request is also communicated to the network node 102C, which is acting as a PDVA. In addition, the request is transmitted to other nodes in the network environment 100, which are not shown.

As with the advertisement message from the DVA, the request communication 104 may be a type-length-value (TLV) element within an underlying communication protocol, such as within a link state packet (LSP) used in a link state routing protocol. Link state routing protocols are particularly useful for this type of broadcast messaging because many link state routing protocols include extensible features such that additional TLVs may be appended without interfering with the main functionality of the protocol. Other types of broadcast protocols may also be adapted or configured to provide the advertising, request, and confirmation mechanisms described herein.

The request communication 104 may be formatted and configured in different ways. In an embodiment, a request communication 104 includes a TLV with a request bit set to indicate that the request communication 104 includes a request for a value. In an embodiment, a request communication 104 includes an invalid value to indicate that the request communication 104 is a request for a value. For example, when requesting a network address, a TLV with a value of "0.0.0.0" may be used to indicate that the request communication 104 is a request for a new address to be assigned to the network node. In an embodiment, a request communication 104 includes a requested value.

In addition, the request communication 104 may include a request flag to indicate that the request communication 104 is a request, not a broadcast of a currently assigned value. Based on the request flag, the DVA 102B may attempt to reassign the requested value to the requesting node 102A. In an embodiment, a TLV is designed to include both a request flag and a value field, such that if the request flag is set, then the value field is considered by the DVA. However, other nodes in the network may ignore the request communication 104 when the request flag is set because the request flag indicates that the value is unconfirmed and may be invalid for the advertising node. When the request flag is set and the value field includes a valid value, then the request is considered to be a request for the provided valid value. When the value field includes an invalid value, then the request is considered to be for a new value.

Upon receipt of the broadcasted request 104, at 106, the network node acting as the DVA 102B processes the message by attempting to allocate a value to the network node. The processing includes decoding the request message 104, such as for example, decoding a TLV associated with the request message 104.

The process of allocating a value to the network node 106 may include the steps of examining the request message 104 for a requested value. When a requested value is included in the request message 104 (indicated by the request flag), the DVA may refer to a data store with the pool of values to determine whether the requested value is available. In an embodiment, when the requested value is not available, the DVA may allocate a new value to the network node currently associated with the requested value. After confirming that the network node has received and is using the new value (e.g., the requested value is released from use), then the DVA may assign the requested value to the requesting node 102A. The requested value may not be available due to various reasons. For example, when a partitioned network is merged, nodes may be assigned duplicate values. As another example, when a node is offline for over a threshold period of time, the value associated with the node may be reassigned to a different node. Then, when the node comes back online and starts broadcasting the previously-used value, the DVA will recognize the conflict.

When there is not a requested value in the request message 104, then the DVA may simply refer to the pool of values to determine an available value to allocate to the requesting node 102A. When more than one value is available to allocate to the requesting node 102A, one or more functions may be used to determine which value to allocate. For example, the values may be ordered and the next available value may be allocated based on the ordering. As another example, the values may be grouped, and values may be allocated from groups in a particular manner (e.g., round robin, random, or serially).

At 108, when the network node 102C acting as a potential DVA receives the request for a value 104 from the requesting network node 102A, the network node 102C marks values associated with the requesting network node 102A as being invalid. Whether the requesting network node 102A is requesting a re-assignment of a particular value or requesting a new value, any previously-used value is invalid until the DVA 102B has performed the allocation.

When a value has been allocated and assigned to the requesting network node 102A, the DVA 102B transmits a message with the assigned value 110 to the requesting network node 102A. The message with the assigned value 110 may be transmitted using various communication modes. In an embodiment, the DVA 102B broadcasts (e.g., advertises) the message with the assigned value 110. The DVA may use a protocol such as Intermediate System to Intermediate System (IS-IS), which is a link-state routing protocol, or Interior Gateway Routing Protocol (IGRP), which is a distance-vector routing protocol, or any other multi-cast protocol to propagate the message with the assigned value 108. Using such a protocol, the requesting network node 102A is assured of receiving the message with the assigned value 110 at some point. In an embodiment, the DVA 102B may directly communicate with the requesting network node 102A. For example, the DVA 102B may transmit the message with the assigned value 110 using User Datagram Protocol (UDP), Transmission Control Protocol (TCP), or other point-to-point protocols to deliver the message with the assigned value 110. The use of UDP is acceptable because the DVA may use the later broadcast messages that include the assigned value as a confirmation.

The message with the assigned value 110 may be encoded in various ways. For example, the message with the assigned value 110 may include one or more individual values or a range of values or set of ranges. The range may be expressed with a start and end value, or a start value and a number of consecutive values included in the assigned range of values. In the context of network addresses, the range may be transmitted with a bit mask of length equal to the number of addresses in the range indicating which addresses out of the range are assigned. In addition, the message with the assigned value 110 may be compressed.

In an embodiment, when the request flag is set, the DVA will send back a response message with the currently assigned value. If the request flag is not set, then the DVA will act when it receives a broadcasted message with a value that is not the value assigned to the broadcasting node. If the value being broadcast is not the correct one, then the DVA will respond with a message to the broadcasting node with the assigned value.

At 112, after the requesting network node 102A receives the assigned value or values, the network node 102A stores the values. In the context of network routing, the requesting network node 102A may store the assigned values (e.g., addresses) in a routing table, assigning the one or more addresses to interfaces on the network node 102A.

After processing the message with the assigned value 110, the requesting network node 102A may broadcast a message that includes the assigned value or values 114. In an embodiment, the requesting network node 102A uses the same TLV as was used for the request for the value 104. However, because the message is not a request, the request flag is cleared. In another embodiment, the requesting network node 102A uses a different TLV to broadcast the assigned value.

When the network node acting as the DVA 102B receives the message that includes the assigned value 114, the DVA 102B interprets the message as a confirmation that the requesting network node 102A has received and processed the message with the assigned value 110. Consequently, in an embodiment, at 116, the DVA 102B stores a confirmation that the requesting network node 102A is using the assigned value. In an embodiment, the DVA 102B operates a timer and repeats the allocation message 110 if the advertised values in the messages broadcasted from the requesting network node 102A are not consistent with the allocation made by the DVA 102B at 106. The timer may be any period from a few seconds to minutes.

At 118, when a network node acting as a potential DVA 102C receives the message that includes the assigned value 114 from the requesting network node 102A, the network node 102C stores the association between the requesting network node 102A and the assigned value. This may include clearing an invalid flag previously set at 108.

The mechanisms described thus far are extensible and adaptable to different situations. For example, when a network becomes partitioned, a DVA may be elected in each partition. Each DVA will know about the allocations up to the time of the partitioning. As each partition continues operation, the DVA maintaining the allocation pools in the respective partition continues to allocate and manage new requests. Although there is a possibility that new allocations may conflict with one another across partitions, this is rectified after repairing the partitioned network. For example, when two partitions are merged, an election process is used to determine the surviving DVA. The remaining DVA will then receive advertisements from the merged network and may detect conflicts and reassign values accordingly. In an embodiment, when the DVA is first elected after a network merge, the DVA may broadcast a message indicating this state of uncertainty. The message may be used by other protocols to reduce or suspend processing until a stable network topology is achieved. In an embodiment, the message is referred to as an "abandon all hope" message and is used to indicate that the network is unstable. After a certain time, or after a particular condition is met, the DVA may broadcast a new message indicating that the network is stable.

Another adaptation is that a network node may store value allocations in non-volatile memory. When stored as such, when the network node is rebooted, brought back online after being inactive, or otherwise activated, the network node can request the same value or values it was previously allocated. The network node does this by setting a request flag in the TLV and advertising the desired values. If there is no conflict with existing allocations, then the DVA may allocate the requested values to the network node.

When a DVA or PDVA suffers from a hardware failure, loses power, or is rebooted, the state of the allocation pool may be lost. In one adaptation, a DVA or PDVA may store the state of an allocation pool in non-volatile memory. Using this type of storage allows a DVA or PDVA to quickly acquire the state of the allocations across the network. In another adaptation, the DVA or PDVA may rebuild the state of the allocation pool by using the broadcasted messages from each network node. In another adaptation, the DVA or PDVA may have a relationship with a backup node, where the backup node is used by the DVA or PDVA to obtain the state of the allocation pool. In particular, the backup node may be another DVA or PDVA node that is already maintaining the state of the allocation pool and communicates the state to the node coming online.

Another adaptation allows for a manual configuration of some network nodes. In particular, some users may wish to expressly configure some or all values associated with a network node. In this case, the configured values are advertised with a "manually configured" flag set. This manually configured flag may be used by the DVA to reserve the configured values for the advertising node. In particular, the DVA will not allocate the manually configured values to other network nodes and in the case that the manually configured values are allocated already, the DVA will reassign the values to the network node that has been manually configured. To reassign a value from one node to another, the node currently associated with the value is sent a message with a new value. Once the new value is detected in a broadcast message from the node, then the manually requested value is given to the requesting node. In the event that the same value is manually configured for two or more different network nodes, where values are to be unique to each node, then an alert may be generated and communicated. One mechanism to detect inconsistencies or conflicts includes the DVA advertising the allocated values.

To adapt the mechanisms described herein for distance-vector routing protocols, the distance-vector protocol may be modified to carry a tuple of: an address of the node to send the allocated value to, a requested value, a request flag, and a manually configured flag. Once the tuple is broadcast, the DVA performs a similar allocation and communication of the return message with the allocated value to the requesting node. The requesting node waits to see the allocated value appear in a message or advertisement. Because the distance-vector state does not remain in the network in the same way as with link-state protocols, the DVA may be modified to remember the value.

An illustration of the value allocation mechanism is described within the context of the Not-Via protocol. The Not-Via protocol is briefly described hereafter.

When a link or a router fails, only the neighbors of the failure are initially aware that the failure has occurred. In a network operating IP fast reroute (IPFRR), the routers that are the neighbors of the failure repair the failure. These repairing routers have to steer packets to their destinations despite the fact that most other routers in the network are unaware of the nature and location of the failure.

A common limitation in most IPFRR mechanisms is an inability to steer the repaired packet round an identified failure. The extent to which this limitation affects the repair coverage is topology dependent. The mechanism proposed here is to encapsulate the packet to an address that explicitly identifies the network component that the repair must avoid. This produces a repair mechanism, which, provided the network in not partitioned by the failure, can achieve a repair.

The purpose of a repair is to deliver packets to their destination without traversing a known failure in the network, e.g., to deliver the packet not-via the failure. In its simplest form, this repair mechanism works by assigning an additional address to each interface in the network. This additional address is called the not-via address. The semantics of a not-via address are that a packet addressed to a not-via address is delivered to the router with that address, not via the neighboring router on the interface to which that address is assigned.

To repair a failure, the repairing router encapsulates the packet to the not-via address of the router interface on the far side of the failure. As such, the routers on the repair path automatically calculate a network path that avoids the failed component.

According to the not-via specification, a router which is IPFRR-capable advertises the not-via addresses associated with each protected interface in a TLV contained within its link state packets (LSPs). Thus, by re-using the same messages and interpreting the address value or values as a request in certain situations, as described herein, the present description provides an efficient mechanism of requesting and fulfilling not-via addresses.

For example, when a router first comes online, the router may advertise its not-via addresses as zero (e.g., 0.0.0.0) and set a request bit in the advertisement TLV. Other not-via capable routers may ignore these invalid not-via addresses. When the designated value allocator, referred to as a designated address allocator (DAA) in this context, receives the address advertisements with the request bit set, the designated address allocator allocates one or more addresses out of the unused portion of its configured blocks equal to the number of addresses requested. The DAA may then inform the requesting router of these allocated addresses.

There are a number of ways to inform the router, including, but not limited to, transmitting a direct message (e.g., UDP or IP) to the router and advertising the allocated addresses in a new TLV in the DAA's LSPs. The communication does not need to be reliable because, as described herein, the updated not-via TLV provides confirmation of receipt by the requesting router.

On receipt of the allocation, the requesting router assigns the allocated addresses to its interfaces and advertises the addresses in a subsequent not-via TLV as per the not-via protocol. However, in the subsequent advertisement, the request bit is cleared, which signals other routers in the network to use the addresses provided.

Consequently, receipt of the advertisement including the allocated addresses serves as confirmation to the DAA that the requesting router has received and is using the allocated addresses. The advertisement is received during normal LSP flooding. The DAA may periodically repeat the allocation message if an advertisement containing the allocated not-via addresses is not received. The DAA may use a timer to trigger the periodic message. Eventually, the DAA will resolve any discrepancy between what the DAA has allocated and the actual not-via addresses in use by the requesting router.

In the event that a DAA goes offline, another address allocation capable router will be elected as the DAA to replace the offline DAA. When a new DAA comes online, it may ascertain the current allocations in several ways. For example, the new DAA may examine the not-via advertisements of all the routers in its link state protocol database (LSPDB). By examining all the LSPs, and not just those of routers which are reachable, the new DAA will have information about allocations previously given to routers, which are temporarily down for a period less than a maximum age. As another example, the new DAA may maintain its own copy of the allocations based on the advertised request messages and advertised confirmation messages.

In the event that the network becomes partitioned, a DAA will be elected in each partition, but each DAA will know about the entire set of allocations. Although there is a possibility that any new allocations granted during the partition may conflict with one another, upon repair of the partition, a new DAA election is conducted and the newly elected DAA will detect the conflicts and reassign one set of addresses.

The DAA, or even all address allocation capable routers, may keep a record of existing allocations so that even if a router is unavailable for more than the maximum age and consequently its allocations are lost from the LSPDB, the router can be allocated the same set of addresses when it returns. If all address allocation capable routers keep this information, then this will be the case even when there is a change in the DAA.

A router may keep its current not-via address allocation in non-volatile random access memory (NV-RAM), so that when it is rebooted it can request the same set of addresses as it previously had. The router does this by setting the request bit and advertising the desired not-via addresses (rather than zeros). If there is no conflict, the DAA will allocate these requested addresses to the requesting router. Although the actual mapping of the set of addresses to individual interfaces at the router is a private matter, it is preferable to allocate the same address to the same interface when possible.

In the case where a user wants to expressly configure one or more not-via addresses, the configured not-via addresses may be advertised with a "manually configured" bit set. The manually configured bit informs the DAA that the requested addresses are configured and in use and cannot be allocated to other routers. Further, if the addresses have been used, then the allocation should be corrected to allow the manually configured router to obtain the requested addresses and reallocate new addresses to the router or routers previously allocated the configured addresses. In the event that two routers are manually configured to use the same addresses, the DAA may be configured to report an error. In addition, not-via may be suspended during the period of conflict.

In order to detect inconsistent configuration of the master address blocks, the configured address blocks may be advertised by the DAA to all address allocation capable routers and any inconsistencies reported to a user (e.g., an administrator).

Although this description includes a specific illustration using the not-via addresses, it is understood that other protocols that use an advertising mechanism may be adapted to provide the systems and methods described herein. For example, metrics may be requested using a distance-vector protocol and allocated using a designated metric allocator.

Figure 2:
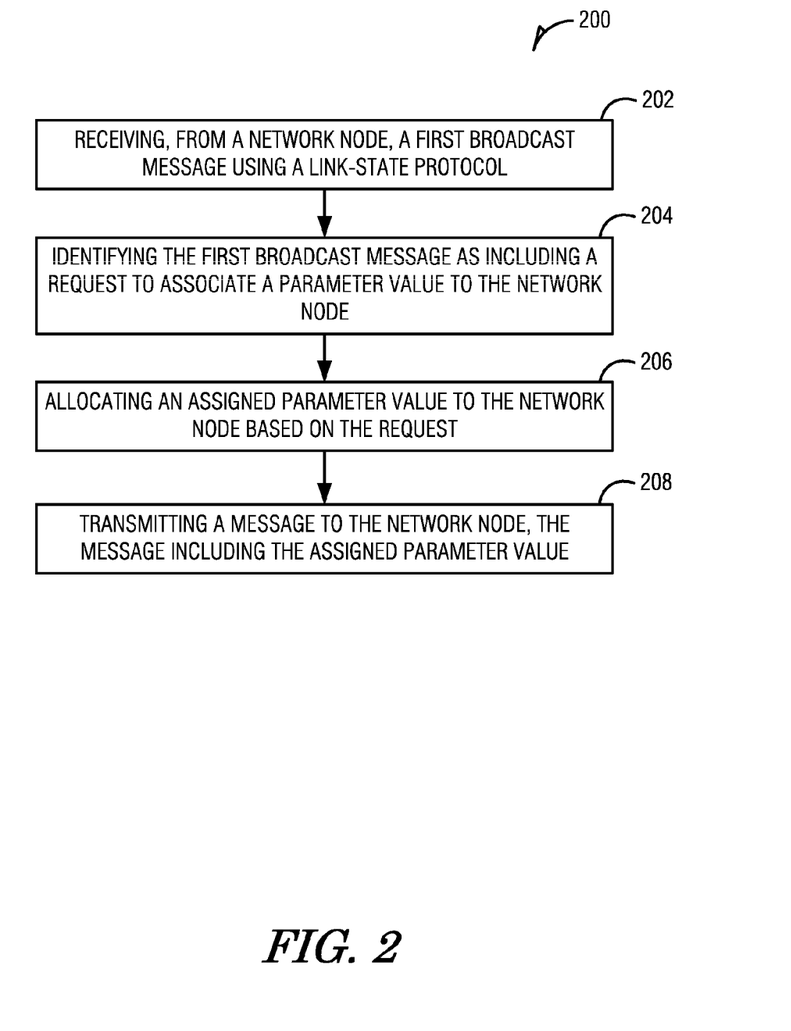
FIG. 2 is a flow diagram illustrating a method of allocating a value to a network node, in accordance with an embodiment.

FIG. 2 is a flow diagram illustrating a method 200 of allocating a value to a network node, in accordance with an embodiment. At 202, a first broadcast message using a link-state protocol is received from a network node at a designated value allocator. In an embodiment, the designated value allocator is a network node selected from a plurality of network nodes in an electronic network. In a further embodiment, the first broadcast message is broadcast from a network node in the electronic network to every other network node in the electronic network.

At 204, the first broadcast message is identified as including a request to associate a parameter value to the network node.

In an embodiment, the first broadcast message is examined for a request flag. When a request flag is found, the value of the request flag is accessed and using the value of the request flag, the first broadcast message is identified as a request. For example, a request flag may be implemented as a bit within the broadcast message. A bit value of zero may indicate that the message is not a request for a particular value, whereas a bit value of one may indicate that the message is a request for a particular value.

In an embodiment, the first broadcast message is examined for a requested parameter value. Then, it is determined whether the requested parameter value is available to be assigned to the network node and, if so, the requested parameter is allocated as the assigned parameter. The requested parameter value may be any type of value, such as internet addresses, distance-value metrics, or a value used where all routers should agree upon a single value.

In an embodiment, a present value of the parameter is obtained from the first broadcast message. Based on a determination of whether the present value is an invalid value, the first broadcast message is identified as including the request. For example, in the context of an address request, a value of "0.0.0.0" may be considered an invalid value and consequently, the message is interpreted as a request for an address value.

In an embodiment, the first broadcast message is examined to determine whether any value has been assigned to the parameter and the first broadcast message is identified as including the request when no value has been assigned to the parameter. For example, a value field may be empty or have a NULL value, indicating that a value has not been assigned or allocated to the requesting node. As such, the broadcast message is interpreted as being a request for allocated value.

At 206, an assigned parameter value is allocated to the network node based on the identification of the request included in the first broadcast message. In some cases, the broadcast message may include a requested value, which is then allocated to the requesting node.

At 208, a message including the assigned parameter value is transmitted to the network node. The message may be directly or indirectly communicated to the network node. A direct communication is considered a point-to-point communication and includes the use of a User Datagram Protocol (UDP) message or an Internet Protocol (IP) message, for example. An indirect communication includes broadcast protocols, such as link state or distance-vector protocols.

In an embodiment, transmitting the message to the network node is performed by first constructing a User Datagram Protocol (UDP) message and then transmitting the UDP message to the network node.

In a further embodiment, a second broadcast message including the assigned parameter value previously allocated to the network node is received at the designated value allocator. An indicium confirming the allocation of the assigned parameter value to the network node is then stored.

In a further embodiment, a second broadcast message including a second request to associate a parameter value with the network node is received at the designated value allocator. A second message is then transmitted from the designated value allocator to the network node, the second message including the assigned parameter value previously allocated to the network node.

Figure 3:
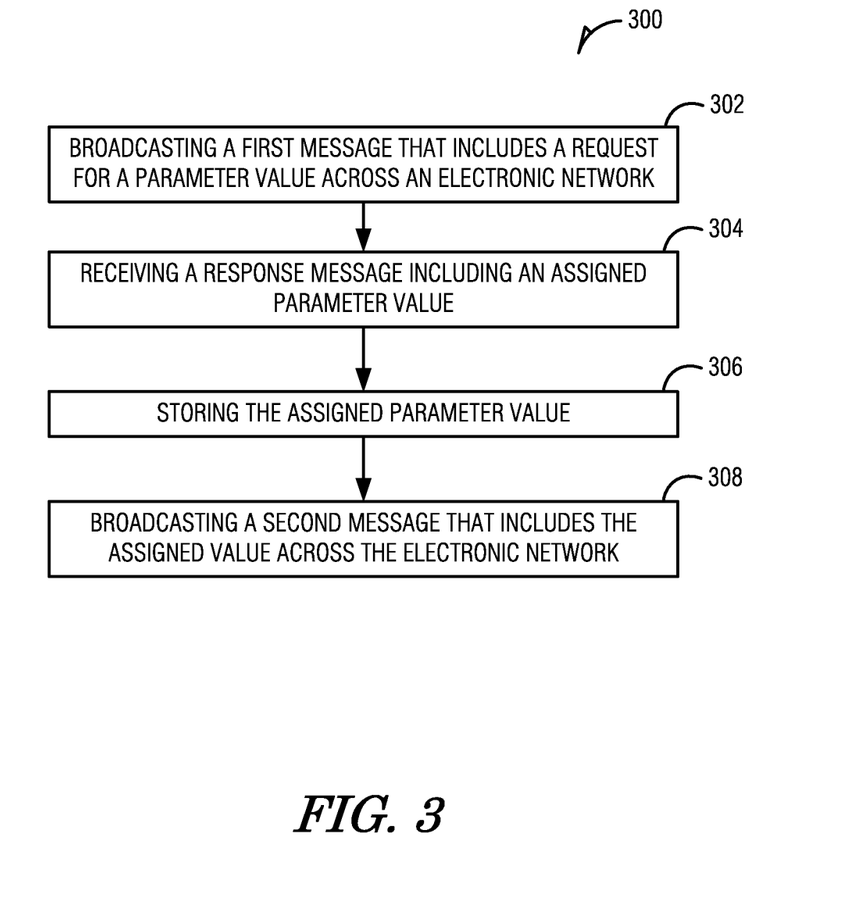
FIG. 3 is a flow diagram illustrating a method of requesting a value for a parameter over an electronic network from a network node, the parameter being associated with the network node, in accordance with an embodiment.

FIG. 3 is a flow diagram illustrating a method 300 of requesting a value for a parameter over an electronic network from a network node, the parameter being associated with the network node, in accordance with an embodiment. At 302, a first message that includes a request for a parameter value is broadcast across an electronic network from a network node. In an embodiment, the first message includes a request flag set to indicate that the first message is a request for a parameter value. In an embodiment, the first message includes a previously-assigned parameter value and a request flag, the request flag being set to indicate that the first message is a request for a parameter value and the previously-assigned value being a value that the network node prefers to be assigned to the parameter value.

At 304, a response message including an assigned parameter value is received. The response message may be received using various communication protocols, such as UDP, IP, link state, or distance-vector.

At 306, the assigned parameter value is stored. The assigned parameter value may be stored in non-volatile random access memory (NV-RAM). Use of NV-RAM may provide a quick mechanism for recovery.

At 308, a second message that includes the assigned parameter value is broadcast across the electronic network from the network node. The second message may also include one or more flags to indicate other status, such as whether the message is a request, a confirmation, a manually configured parameter value, or other indicia. In the case of the second message including the assigned parameter, a request flag may be included in the second message and the request flag may be cleared to indicate that the second message is a "live" message with active values in use by the network node.

Figure 4:
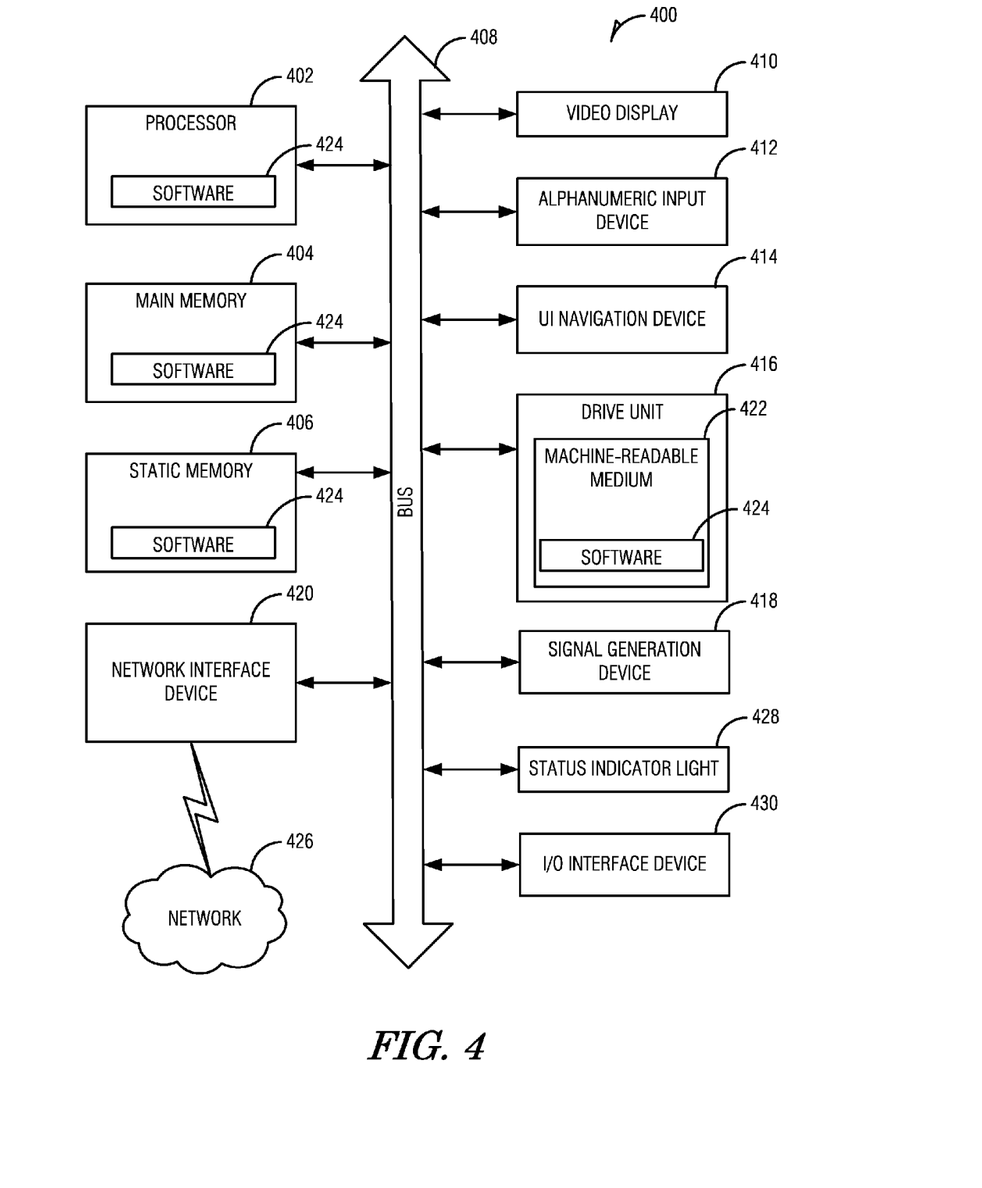
FIG. 4 is a block diagram of a machine, in accordance with an embodiment, in the example form of a computer system within which a set of instructions, for causing the machine to perform any one or more of the methodologies discussed herein, may be executed.

FIG. 4 is a simplified block diagram of a machine, in accordance with an embodiment, in the example form of computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine includes any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a plasma display, a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420. In addition, the computer system 400 includes a status indicator light 428 and an input/output interface device 430.

The status indicator light 428 may include one or more light sources that provide a status or condition of the computer system 400. As described above, the status indicator light 428 may comprise solid-state lighting, such as light-emitting diodes (LEDs), organic light-emitting diodes (OLED) or polymer light-emitting diodes (PLED). Other types of lighting or lamps may be used, including but not limited to incandescent light bulbs, fluorescent lighting, high-intensity discharge lighting, or plasma lamps. In addition, status indicator lights may include a display, such as a LED display or liquid crystal display (LCD).

The input/output interface device 430 may be configured to communicate with one or more external systems, sensors, devices, or the like. External systems may include, but are not limited to, an ambient lighting control system, an HVAC system, or a security system. Sensors may include, but are not limited to, cameras, photosensitive sensors, motion detectors, weight detectors, keycard systems, or electrostatic discharge units. Additional devices may include a rack or cabinet control computer terminal, a door switch, an access paneling switch, a timer, or a clock.

The disk drive unit 416 may include machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, where the main memory 404 and the processor 402 also constitute machine-readable, tangible media.

Software 424 may further be transmitted or received over network 426 via network interface device 420 utilizing any one of a number of well-known transfer protocols (e.g., HTTP).

While machine-readable medium 422 is shown in an embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media.

Although the disclosure has been described with reference to specific embodiments, it will be evident that various modifications and changes may be made to these embodiments without departing from the broader spirit and scope. Accordingly, the specification and drawings are to be regarded in an illustrative rather than a restrictive sense. This disclosure is intended to cover any and all adaptations or variations of various embodiments. Combinations of the above embodiments, and other embodiments not specifically described herein, will be apparent to those of skill in the art upon reviewing the above description. For example, one functional, computational, or hardware module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the appended claims, the terms "including" and "in which" are used as the plain-English equivalents of the respective terms "comprising" and "wherein," respectively. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or a particular ordering on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method performed by a first network node of a network, the method comprising:
   sending an advertisement of availability to become a not-via address allocator, the advertisement including a system identifier of the first network node;
   receiving an advertisement sent from each of a plurality of other network nodes, the advertisements each including a system identifier of the network node sending the advertisement;
   determining that the system identifier of the first network node is greater than the system identifiers in the received advertisements; and
   responsive to determining that the system identifier of the first network node is greater than the system identifiers in the received advertisements, assuming the role of the not-via address allocator;
   receiving, at the not-via address allocator from a second network node of the network, a first broadcast message using a link-state protocol;
   identifying the first broadcast message as including a request to associate a not-via address to the second network node;
   assigning a not-via address to the second network node based on the identification of the request included in the first broadcast message, the assigned not-via address being a unique address to the network;
   transmitting a User Datagram Protocol (UDP) message to the second network node, the UDP message including the assigned not-via address, the not-via address specifying an alternative address for delivering packets without traversing a known failure in the network;
   receiving, at the not-via address allocator, a second broadcast message from the second network node including an address that is not the not-via address previously assigned to the second network node;
   responsive to receiving the second broadcast message, starting a timer;
   responsive to an expiry of the timer, determining whether a third broadcast message was received from the second network node while the timer was running, the third broadcast message including the assigned not-via address; and
   responsive to determining that the third broadcast message was not received, resending the UDP message including the assigned not-via address to the second network node.

2. The method of claim 1, wherein identifying the first broadcast message as including a request further comprises:
   examining the first broadcast message for a request flag;
   accessing the value of the request flag; and
   identifying that the first broadcast message includes the request based on the value of the request flag.

3. The method of claim 2, further comprising:
   examining the first broadcast message for a requested not-via address;
   determining whether the requested not-via address is available to be assigned to the second network node; and
   assigning the requested not-via address as the assigned not-via address when the requested not-via address is available.

4. The method of claim 1, wherein identifying the first broadcast message as including a request further comprises:
   obtaining a present value of a not-via address from the first broadcast message;
   determining whether the present value is an invalid value; and
   identifying that the first broadcast message includes the request when the present value is an invalid value.

5. The method of claim 1, wherein identifying the first broadcast message as including a request further comprises:
   examining the first broadcast message to determine whether any not-via address has been assigned to the second network node; and
   identifying that the first broadcast message includes the request when no not-via address has been assigned to the second network node.

6. The method of claim 1, wherein the first broadcast message is broadcast from the second network node in the network to every other network node in the network.

7. A first network node apparatus comprising:
   a processor; and
   a memory in communication with the processor, the memory comprising instructions executable by the processor, which when executed, the processor being operable to:
   send an advertisement of availability to become a not-via address allocator, the advertisement including a system identifier of the first network node;
   receive an advertisement sent from each of a plurality of other network nodes, the advertisements each including a system identifier of the network node sending the advertisement;
   determine that the system identifier of the first network node is greater than the system identifiers in the received advertisements; and
   assume the role of the not-via address allocator responsive to determining that the system identifier of the first network node is greater than the system identifiers in the received advertisements;

receive a first broadcast message from a second network node of the network using a link-state protocol;

identify the first broadcast message as including a request to associate a not-via address to the second network node;

assign a not-via address to the second network node based on the identification of the request included in the first broadcast message, the assigned not-via address being a unique address to the network;

transmit a User Datagram Protocol (UDP) message to the second network node, the UDP message including the assigned not-via address, the not-via address specifying an alternative address for delivering packets without traversing a known failure in the network;

receive, at the not-via address allocator, a second broadcast message from the second network node including an address that is not the not-via address previously assigned to the second network node;

start a timer responsive to receiving the second broadcast message;

determine, responsive to an expiry of the timer, whether a third broadcast message was received from the second network node while the timer was running, the third broadcast message including the assigned not-via address; and resending the UDP message to the second network node including the assigned not-via address responsive to determining that the third broadcast message was not received.

8. The apparatus of claim 7, further comprising instructions executable by the processor, which when executed, the processor being operable to:

store an indicium confirming the assignment of the not-via address to the second network node in the memory responsive to receiving the third broadcast message before the expiry of the timer, the third broadcast message including the assigned not-via address previously assigned to the second network node.

9. The apparatus of claim 7, wherein the instructions used to determine whether the first broadcast message includes the request further comprise instructions executable by the processor, which when executed, the processor being operable to:

examine the first broadcast message for a request flag;
access the value of the request flag; and
identify that the first broadcast message includes the request based on the value of the request flag.

10. The apparatus of claim 9, further comprising instructions executable by the processor, which when executed, the processor being operable to:

examine the first broadcast message for a requested not-via address;
determine whether the requested not-via address is available to be assigned to the second network node;
assign the requested not-via address to the second network node when the requested not-via address is available.

11. The apparatus of claim 7, wherein the instructions used to determine whether the first broadcast message includes the request further comprise instructions executable by the processor, which when executed, the processor being operable to:

obtain a present value of the a not-via address from the first broadcast message;
determine whether the present value is an invalid value; and
identify that the first broadcast message includes the request when the present value is an invalid value.

12. The apparatus of claim 7, wherein the instructions used to determine whether the first broadcast message includes the request further comprise instructions executable by the processor, which when executed, the processor being operable to:

examine the first broadcast message to determine whether any not-via address has been assigned to the second network node; and
identify that the first broadcast message includes the request when no not-via address has been assigned to the network node.

13. The apparatus of claim 7, wherein the first broadcast message is broadcast from the second network node in the network to every other network node in the network.

* * * * *

UNITED STATES PATENT AND TRADEMARK OFFICE
CERTIFICATE OF CORRECTION

| | | |
|---|---|---|
| PATENT NO. | : 8,553,527 B2 | Page 1 of 1 |
| APPLICATION NO. | : 12/476914 | |
| DATED | : October 8, 2013 | |
| INVENTOR(S) | : Bryant et al. | |

It is certified that error appears in the above-identified patent and that said Letters Patent is hereby corrected as shown below:

In the Claims

In column 16, line 21, in Claim 11, after "of", delete "the", therefor

Signed and Sealed this
Fifteenth Day of April, 2014

Michelle K. Lee
*Deputy Director of the United States Patent and Trademark Office*